(12) United States Patent
Agrawal et al.

(10) Patent No.: US 11,562,388 B2
(45) Date of Patent: Jan. 24, 2023

(54) MACHINE LEARNED MODELS FOR ITEMS WITH TIME-SHIFTS

(71) Applicant: SAP SE, Walldorf (DE)

(72) Inventors: Rajat Agrawal, Houston, TX (US); Uday Guntupalli, Naugatuck, CT (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/081,680

(22) Filed: Oct. 27, 2020

(65) Prior Publication Data

US 2022/0020042 A1 Jan. 20, 2022

Related U.S. Application Data

(60) Provisional application No. 63/053,403, filed on Jul. 17, 2020.

(51) Int. Cl.
*G06Q 30/02* (2012.01)
*G06N 20/00* (2019.01)

(52) U.S. Cl.
CPC ......... *G06Q 30/0206* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| | | | |
|---|---|---|---|
| 9,395,262 B1 * | 7/2016 | Kumar | G01M 3/2815 |
| 9,519,912 B2 * | 12/2016 | Chidlovskii | G06N 20/00 |
| 10,354,195 B2 * | 7/2019 | Chaudhary | G06N 7/005 |
| 10,560,313 B2 * | 2/2020 | Sglavo | H04L 41/16 |
| 10,586,105 B2 * | 3/2020 | Freitag | G06T 7/0016 |
| 10,878,505 B1 * | 12/2020 | Blair | G06F 40/20 |
| 10,984,433 B1 * | 4/2021 | Doner | G06N 7/005 |

(Continued)

FOREIGN PATENT DOCUMENTS

| | | | | |
|---|---|---|---|---|
| WO | WO-2017117445 A1 * | 7/2017 | | E21B 43/006 |
| WO | WO-2018222308 A1 * | 12/2018 | | G06N 99/005 |

(Continued)

OTHER PUBLICATIONS

Shambulingappa, H. S. "Crude Oil Price Forecasting Using Machine Learning." International Journal of Advanced Scientific Innovation 1.1 (2020). (Year: 2020).*

(Continued)

*Primary Examiner* — Brian M Epstein
*Assistant Examiner* — Derick J Holzmacher
(74) *Attorney, Agent, or Firm* — Schwegman Lundberg & Woessner, P.A.

(57) ABSTRACT

In an example embodiment, a series of machine learned models are trained and utilized in conjunction with each other to improve the reliability of predictions of fuel costs. One of these models is specifically trained to learn the "gap" time for a particular retail location, meaning the amount of time between when the futures contract market price on a trading exchange making up the fuel blend has the most correlation with the retail price of that fuel blend (for that particular location). This greatly enhances the reliability of the predictions of fuel costs, and, as described in detail herein, these predictions may be used in a number of different applications in unique ways.

21 Claims, 9 Drawing Sheets

(56) References Cited

U.S. PATENT DOCUMENTS

| | | | |
|---|---|---|---|
| 2008/0040204 A1 | 2/2008 | Ford et al. | |
| 2011/0302001 A1 | 12/2011 | Fell et al. | |
| 2015/0081392 A1 | 3/2015 | Fox et al. | |
| 2015/0088790 A1* | 3/2015 | Chidlovskii | G06Q 30/0202 706/12 |
| 2015/0352947 A1* | 12/2015 | Hubschman | H04W 4/44 340/450.2 |
| 2016/0110808 A1* | 4/2016 | Yu | G06Q 40/04 705/37 |
| 2016/0189210 A1* | 6/2016 | Lacey | G06N 7/005 705/7.31 |
| 2016/0196521 A1* | 7/2016 | Wada | G06Q 50/06 705/7.25 |
| 2017/0185922 A1* | 6/2017 | Lange | G06N 5/003 |
| 2017/0364803 A1* | 12/2017 | Calmon | G06N 3/0454 |
| 2018/0341898 A1* | 11/2018 | Bose | G06Q 30/0202 |
| 2018/0349790 A1* | 12/2018 | Cai | G06N 20/00 |
| 2019/0121350 A1* | 4/2019 | Cella | G01M 13/028 |
| 2019/0325467 A1* | 10/2019 | Perry | G06Q 30/0605 |
| 2019/0325534 A1* | 10/2019 | Perry | G06Q 10/0836 |
| 2019/0372345 A1* | 12/2019 | Bain | H02J 3/381 |
| 2020/0051145 A1* | 2/2020 | LeBlanc, Jr. | G06Q 30/0219 |
| 2020/0065845 A1* | 2/2020 | LeBlanc, Jr. | G06Q 30/0213 |
| 2020/0189385 A1* | 6/2020 | Dudar | B60K 15/03504 |
| 2020/0257943 A1* | 8/2020 | Huber | G06N 3/084 |
| 2022/0020043 A1* | 1/2022 | Agrawal | G06Q 30/018 |
| 2022/0138785 A1* | 5/2022 | Zarakas | G06N 20/00 705/7.35 |

FOREIGN PATENT DOCUMENTS

| | | | | |
|---|---|---|---|---|
| WO | WO-2019089146 A1 * | 5/2019 | | G06N 20/00 |
| WO | WO-2019145952 A1 * | 8/2019 | | G06N 20/00 |
| WO | WO-2019209947 A1 * | 10/2019 | | G01W 1/10 |
| WO | WO-2020086851 A1 * | 4/2020 | | G06F 16/25 |

OTHER PUBLICATIONS

Herrera, Gabriel Paes, et al. "Data on forecasting energy prices using machine learning." Data in brief 25 (2019): 104122. (Year: 2019).*

Herrera, Gabriel Paes, et al. "Long-term forecast of energy commodities price using machine learning." Energy 179 (2019): 214-221. (Year: 2019).*

Čeperić, Ervin, Saša Žiković, and Vladimir Čeperić. "Short-term forecasting of natural gas prices using machine learning and feature selection algorithms." Energy 140 (2017): 893-900. (Year: 2017).*

Huang, Siteng, et al. "Dsanet: Dual self-attention network for multivariate time series forecasting." Proceedings of the 28th ACM international conference on information and knowledge management. 2019. (Year: 2019).*

Henzel, Joanna, Jakub Bularz, and Marek Sikora. "Impact of time series clustering on fuel sales prediction results." FedCSIS (Position Papers). 2021. (Year: 2021).*

Su, Moting, et al. "Data driven natural gas spot price prediction models using machine learning methods." Energies 12.9 (2019): 1680. (Year: 2019).*

Chernenko, Sergey, et al., "The Information Content of Forward and Futures Prices: Market Expectations and the Price of Risk", Board of Governors of the Federal Reserve System International Finance Discussion Papers No. 808, (Jun. 2004), 27 pgs.

Gupta, Nalini, et al., "Crude Oil Price Prediction using Artificial Neural Network", The 3rd International Conference on Emerging Data and Industry 4.0 (EDI40). Procedia Computer Science 170, (2020), 642-647.

Shastry, Aditya, et al., "Prediction of Crop Yield Using Regression Techniques", International Journal of Soft Computing 12(2), (2017), 96-102.

Xuerong, Li, et al., "Text-based crude oil price forecasting: A deep learning approach", International Journal of Forecasting 35, (2019), 1548-1560.

"Price forecast Oil, gas & chemicals", Deloitte, (Mar. 31, 2020), 24 pgs.

* cited by examiner

MACHINE LEARNED MODELS FOR ITEMS WITH TIME-SHIFTS

CROSS-REFERENCE TO RELATED APPLICATIONS

This application claims the benefit of U.S. Provisional Application No. 63/053,403, filed Jul. 17, 2020, entitled "MACHINE LEARNED MODELS FOR FUELING," which is incorporated herein by reference in its entirety.

TECHNICAL FIELD

This document generally relates to machine learning. More specifically, this document relates to machine learned models for items with time shifts.

BACKGROUND

Fuels used for transportation play a vital role in the economy, and costs and overhead related to fuels can be a significant drag on the transportation sector specifically. Industries such as the airline industry and shipping industry rely heavily on minimizing fuel costs, although individuals also rely heavily on fuel costs, especially when planning long trips. Intelligent fuel procurement by businesses and individuals has a cascading positive impact on commerce, industry and ultimately the overall economy.

The prices of fuels and certain other commodities are difficult to predict accurately due to the presence of time shifts. Specifically, time shifts refer to the time difference between when a component of the commodity is traded on exchange and when the component is consumed in the supply chain. Fuel, for example, is commonly comprised of a blend of multiple different fuel components, each with their own national price. A fuel reseller may blend the different fuel components and then transport it to a fueling station for sale to a consumer, but this blending and transportation process takes time, and thus the price that the consumer actually pays for a fuel blend on a given day may vary based on a national price of a component that was sold several days earlier.

Machine learning may be applied to the prediction of fuel prices, and the prices of other commodities with time shifts, which allows businesses and individuals to plan commodity related activities e.g. purchases ahead of time to minimize costs, but prior art machine learning techniques, which rely upon training models in statistical ways and then utilizing those models, produce unreliable results when performing such predictions. What is needed is an improved modelling and training based on supply chain and use of machine learning techniques to make such predictions more reliable.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
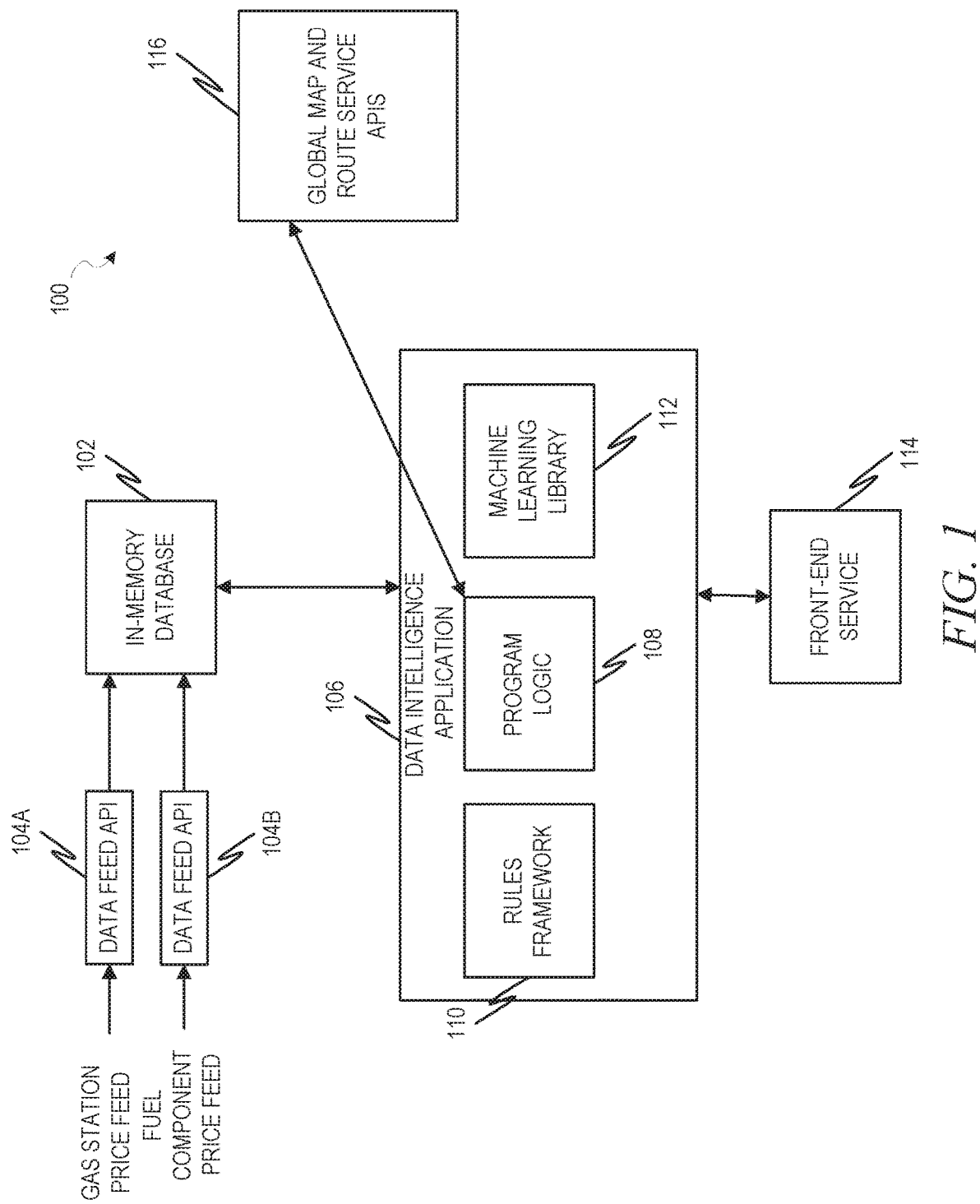
FIG. 1 is a block diagram illustrating a system in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, various machine learning techniques are described in the context of predicting fuel prices, and specifically handling the time shift that occurs with such fuel prices. One of ordinary skill in the art will recognize, however, that the same techniques can be applied to any item with a time shift, and thus the scope of the claims shall not be limited to fuel embodiments unless explicitly recited.

More particularly, the techniques described in this document can be useful in predicting prices of any item that is comprised of a number of different components and there is a time gap between when the components are purchased and when the item is actually sold (either at the wholesale level or the retail level). Examples of items other than fuel may include the following. Prediction of textile prices requires a blend of different fibers. A polyester-cotton blend requires a forecast of both cotton and polyester. Cotton price prediction requires use of cotton futures contract market price. Polyester is synthetically prepared from petroleum so its price is a function of crude oil futures contract market price. The blended price of these two commodities, along with lag prediction machine learned model, will provide the price forecast for the specific textile blend at a particular location.

Chocolate price is blend of future contract market price of cocoa and sugar. The blended price of these two commodities, along with lag prediction machine learned model, will provide the price forecast for the chocolate blend at a particular location.

In these and other non-fuel models, another item provider stands in the place of a fueling station as the entity that sets the price of the final blend. That item provider might be a clothing retailer or wholesaler in the case of clothing, or a chocolate shop in the case of chocolate.

Turning back to fuel, fuel prices are volatile and depend upon many different factors, making them difficult to forecast even with current advanced machine learning techniques. Some of these factors are more national in nature, such as the component costs that make up a particular blend of fuel (e.g., futures contract market price on a trading exchange for gasoline, ethanol, and heating oil), while other factors are local in nature (e.g., local supply versus demand, fuel station competition, taxes etc.). Futures contract market price on a trading exchange serve as reference points in defining prices in the broad market. Individual buy and sell along the chain is based on this price. Additionally, there is a time gap that gets built at each stage of the process chain starting from refinery because of fuel storage at various points. This also includes the storage time when the retail gas station purchases the fuel and it is sold to consumers. This gap is often measured in days and encapsulates the overall inventory holding pattern from refinery until time of sale. The gap in time, however, is different in different retail stations, and results in a disconnect between the retail price of the fuel blend on a particular day and the component futures contract market price on a trading exchange making up the same fuel blend.

In an example embodiment, a series of machine learned models are trained and utilized in conjunction with each other to improve the reliability of predictions of fuel costs. One of these models is specifically trained to learn the "gap" time for a particular location, meaning the amount of time between when the component futures contract market price on a trading exchange of a fuel blend has the most correlation with the retail price of that fuel blend (for that particular location). This greatly enhances the reliability of the predictions of fuel costs, and, as will be described in detail, these predictions may be used in a number of different applications in unique ways.

The process chain for refined products begins from a crude oil refinery. Gasoline and diesel products are transported from refinery storage to a local terminal (for gas station) via pipeline, railcars or truck. The local terminal is used to supply the products to a gas station directly or it can be bought by a wholesaler, who then ships it to individual gas stations via a milk run.

The transportation and inventory holding pattern varies for each gas station, starting from refinery until final sale to consumers. The pricing mechanisms deployed in each leg of this process can also have different variations. Even though each individual leg transacts based on prevailing market price, it does also factor in an inventory holding pattern. This results in a delay in gas station pricing as compared with futures contract market price on a trading exchange. This delay is somewhat unique to each gas station and it makes any price projection based on futures market less accurate.

In an example embodiment, a sliding scale method is introduced, which automatically adjusts itself to each gas station and provides the best correlation with futures market. While the method works for all gas stations, it identifies the delay uniquely to each gas station. This brings in a high degree of correlation with futures market to provide a price prediction.

FIG. 1 is a block diagram illustrating a system 100 in accordance with an example embodiment. The system 100 may include an in-memory database 102. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example of an in-memory database is the HANA® database from SAP SE, of Walldorf, Germany. The in-memory database 102 may store data in one or more application tables. In an example embodiment, data feed application program interfaces (APIs) 104A, 104B connect the in-memory database 102 to external databases with historical and current pricing information. For example, API 104A may connect the in-memory database 102 to a price feed regarding local gas station prices, while API 104B may connect the in-memory database 102 to a price feed regarding fuel component market price (such as publicly traded derivatives, such as futures contract, with respect to fuel components such as gasoline, ethanol, and heating oil). This information may then be stored in the in-memory database 102. It should be noted that in one example embodiment, the in-memory database 102 is operated in the cloud.

A data intelligence application 106 may include program logic 108, which may implement rules obtained from a rules framework 110 and machine learned models from a machine learning library 112 to provide price predictions of fuel costs based on the information stored in the in-memory database 102. As will be described in more detail below, the program logic 108 may train some of the machine learned models in the machine learning library 112 as well as utilize those models, in addition to utilizing models trained by other components, possibly even on external sources.

Also depicted is a front-end service 114, which utilizes the fuel price predictions in one or more practical ways depending upon the software environment. For example, the front-end service 114 may be a transportation management application which may prompt a user for a location (with range for gas stations), date, and a type of fuel, and then provide this information to the program logic 108, which returns a predicted price (or multiple predicted prices, one for each gas station within the range of the specified location). Alternatively, the front-end service 114 may be a mapping tool that allows the user to enter (either directly or indirectly), a route, start and end date and time, range of a gas station along the route, and a type of fuel, and then provides this information to the program logic 108, which returns predicted prices for gas stations along the route (for the dates/times when the vehicle is expected to be near those gas stations). In one example embodiment, this mapping tool may actually assist in selecting an optimal route to find the lowest fuel costs, such as by trying multiple different routes and ranking the routes based on the total fuel costs predicted along that route. To that end, one or more global map and route service APIs 116 may interact with the program logic 108 to aid in these processes.

Figure 2:
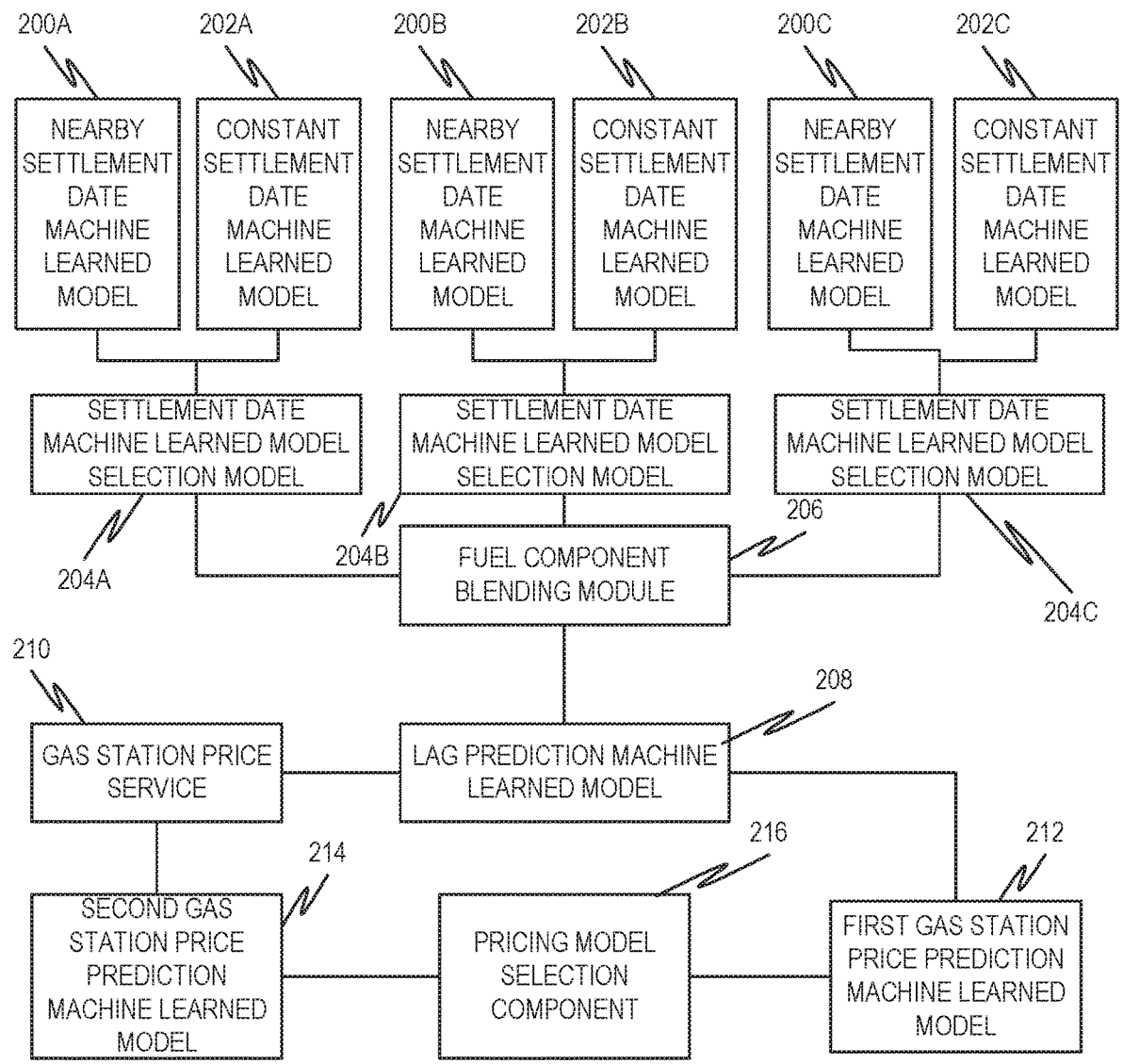
FIG. 2 is a block diagram illustrating a program logic in accordance with an example embodiment.

FIG. 2 is a block diagram illustrating the program logic 108 in accordance with an example embodiment. Here, the logic 108 includes, for each fuel component, two separate models for forecasting the component prices. A nearby settlement date machine learned model 200A, 200B, 200C builds continuous historical data for each pricing date by reading the pricing from the first nearby settlement date. A settlement date is the date the future contract in that component is settled. Any gaps that exist in pricing data due to weekends or holidays may be filled by taking the next working day price if the day in question is a Sunday and the prior working day price if it is anything other than a Sunday (e.g., if it is a Saturday, or a holiday that falls on a Wednesday). A constant settlement date machine learned model 202A, 202B, 202C, however, keeps the settlement date constant (as per first nearby date for each forecast date), although pricing gaps are still filled based on the rules outlined above with respect to the nearby settlement date machine learned model 200A, 200B, 200C. The result is that the constant settlement date machine learned model 202A, 202B, 202C provides more continuity by keeping the settlement date constant, and thus provides a smooth baseline for projecting forecasts, but the underlying price information may not be as strong as the nearby settlement date machine learned model 200A, 200B, 200C.

Since there are certain circumstances in which the nearby settlement date machine learned model 200A, 200B, 200C will perform better and other circumstances where the constant settlement date machine learned model 202A, 202B, 202C will perform better, in an example embodiment a settlement date machine learned model selection model 204A-204C will select the results of one of these two model based on the current circumstances. Root mean square error is determined for each of the models to define the best model based on data trend and seasonality. It should be noted that while root mean square error is one factor, it need not be the only factor, and in an example embodiment, the settlement date machine learned model selection model 204A-C is itself a trained model that may use factors such as mean percentage error and the historical trend of a winning model between the nearby settlement date machine learned model 200A, 200B, 200C and the constant settlement date machine learned model 202A, 202B, 202C. In case there is a difference in this trend while the root mean square error difference is small (e.g., within a preset amount), the trend may be followed. The root mean square error scores for each model 200A, 200B, 200C, 202A, 202B, 202C may be stored in the application tables of the in-memory database to keep a record and establish the trend.

The output of the settlement date machine learned model selection model 204A-204C is a set of forecasts (from the appropriate model) of the fuel component prices. These forecasts may project into the future a certain amount, e.g., up to 180 days.

A fuel component blending module 206 may then produce a forecast for each of a number of different blends of fuel, which utilize the fuel components. For example, unleaded 87 gasoline typically has 10% ethanol and 90% gasoline. Thus, to calculate the forecast for unleaded 87 gasoline, the fuel component blending module 206 may multiply the forecast for the price of gasoline by 0.9 and then multiply the forecast for the price of ethanol by 0.1 and then add the two products. It should be noted that in some instances this blending determination may be more complicated. For example, some states require different blends of the same "type" of gasoline at different times of year (e.g., a "summer blend" and a "winter blend" of unleaded 87 gasoline). In such circumstances, each of these time-based blends may be considered a different blend and be computed separately.

A lag prediction machine learned model 208 may be trained to learn from the underlying data intelligently and identify the lag between a particular gas station's prices and the underlying component futures contract prices. As described above, gas stations are not able to respond immediately to the current market price as other factors, such as the delivery time of the fuel from terminals, the nature of wholesale contracts, or inventory holding patterns, makes it such that there is a gap or "lag" between when the price was set for the components of the fuel blend in question and when the fuel blend in question is actually being sold by the stations. It may take as input an identified input gas station (such as by receiving this information from a front-end component) and pricing data from a gas station price service 210 after subtracting federal and state tax on gasoline and diesel. E.g. Diesel has a federal tax of 24.4 cents per gallon and a Texas state tax of 20 cents per gallon.

Figure 3:
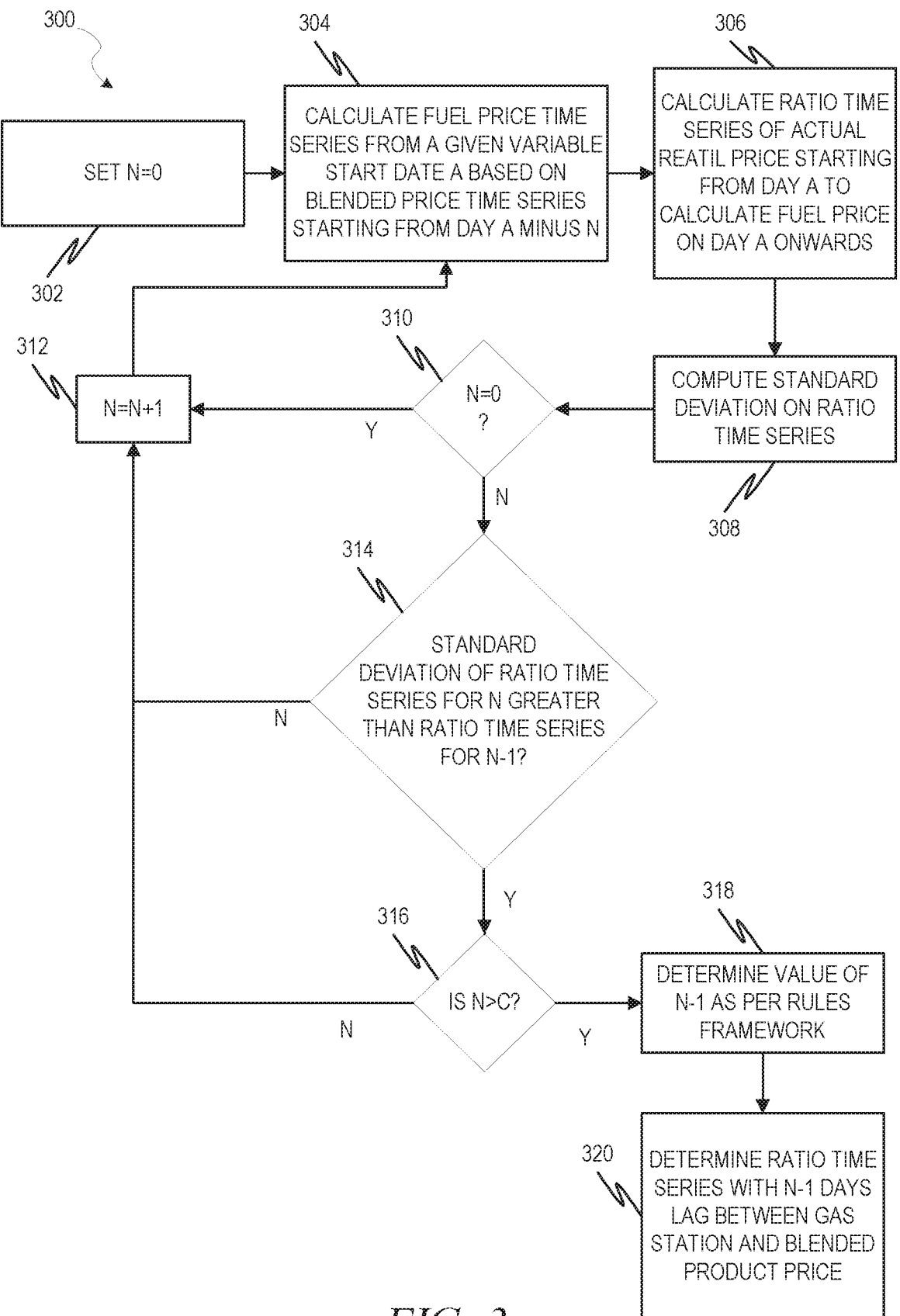
FIG. 3 is a flow diagram illustrating a method of learning a lag time between fuel retail sales price and fuel component futures contract market price on a trading exchange, in accordance with an example embodiment.

FIG. 3 is a flow diagram illustrating a method 300 of learning a lag time between fuel retail sales price (net of federal and state tax) and fuel component futures contract price, in accordance with an example embodiment. This method 300 may be implemented in the lag prediction machine learned model. It may rely on the use of time series, where data for a particular time range is utilized, and attempt to determine a lag (a selected value for n-1, from a plurality of different values that it tries out) between a time range of retail prices and a time range of futures contract prices, based on historical (not forecast) prices. At operation 302, the variable n is set to 0. At operation 304, a fuel price time series $F_a$ of a given variable start date day a going until the last published price day t is calculated based on a blended price time series (from fuel component blending module 206) starting from day a minus n, or $F_a = B_{a-n}$. In an example embodiment, $G_a = \{G_a, G_{a+1}, \ldots G_t\}$ and $B_a = \{B_a, B_{a+1}, \ldots B_t\}$, where G represents gas station product price time series without forecast and B represents blended product price time series without forecast.

It should be noted that if adequate history is not found for any of the time series, an adequate replacement time series, as defined by a rules framework, may be substituted. For example, if a particular gas station does not have pricing data for a particular date range, a next closest gas station's prices may be substituted, if permitted by the rules framework.

At operation 306, a ratio time series ($R_a$) of the actual retail price from day a to t of ($G_a$) to the calculated fuel price $F_a$ is calculated, i.e. $R_a = G_a / F_a$. At operation 308, a standard deviation $\sigma_n$ may be computed on the ratio time series $R_a$. At operation 310, it is determined if n is 0. If so, then at operation 312$n$ is incremented by 1 and the method 300 loops back to operation 304. If not, then at operation 314, it is determined if $\sigma_n$ is greater than $\sigma_{n-1}$. This essentially tells the model whether the standard deviation with the current value for n is greater than the standard deviation with the previous value for n (in other words, whether the standard deviation has gone from getting smaller to getting larger). If not, then at operation 312$n$ is incremented and the method 300 loops back to operation 304. If so, however, then at operation 316, it is determined if n=c, where c is a parameter indicating a minimum number of days of "acceptable" lag. This may help in preventing situations where the model may predict an unreasonably low amount of lag given historical patterns. For example, a gas station in a remote part of the country may historically have a lag of at least 4 days, due in part to its geographic distance from a fuel terminal and the time needed for transport of the fuel to the location. If the model suddenly predicts a lag of only 1 day, however, that likely will have been in error (unless something fundamental has changed, such as a new terminal being built closer to the gas station). Thus, if at operation 316 it is determined that n is not greater than c, then essentially the finding at operation 314 that the standard deviation has turned from getting smaller to getting larger is ignored. However, the value of $\sigma_{n-1}$ and (n-1) days is committed into application table. This is later used by operation 318. If at operation 316 it is determined that n is greater than c, the value of $\sigma_c$, $\sigma_{n-1}$ and (n-1) days is stored in the application table. Operation 318 is used to determine the value of n-1 days based on rules framework which could be an n-1 value that was reached prior to reaching c or at c or after crossing c. It is also used to evaluate periodically if value of c needs to be revised based on historical pattern because something fundamental has changed, such as a new terminal has been built closer to the gas station. Based on operation 318, n-1 days is selected as the value for the lag is committed to an application table of the in-memory database. Both a and c are parameters that may be learned via machine learning model training, and the application table values for $\sigma_{n-1}$ and $\sigma_c$ may be used during that training, along with historical information, in order to modify the values of a and/or c. At operation 320, the ratio time series with n-1 days lag between gas station and blended product price is determined.

Thus, the method 300 may also be described as follows. First, a ratio series is built between the gas station fuel price and the blended product price. Then a standard deviation is computed. Then the blended product series is shifted by a prior day while keeping the total number of records in the series constant (parameter a, as learned via machine learning). Then the ratio series is re-built and the standard deviation computed. This process is iterated until a shift is observed that results in the lowest standard deviation. The number of lag days may be compared with a result stored in an application table (parameter c, as learned via machine learning), and the process is iterated and the standard deviation is again compared between the two shift dates to arrive at a final decision with the correct lag and the ratio series with this lag is used in the subsequent step 212.

Referring back to FIG. 2, the output of the lag prediction machine learned model 208 is a ratio time series based on the predicted lag for the retail gas station. The ratios in the ratio time series represent the percentage deviation between the gas station retail price (net of applicable taxes) and the blend of underlying components traded in the futures market. There are several reasons for this percentage deviation. Gas station can have individual branded products with additives, e.g. Unleaded Octane 89, Unleaded Octane 93 etc. which have a premium pricing. Additionally, each individual gas station pricing has to reflect the incurred logistical and other costs starting from the refinery. The full ratio time series (without any truncation based on parameter a) is used for further forecasting the gas station price via first gas station price prediction machine learned model 212, which is trained to output a forecast prediction of the ratio series. The forecast of this ratio series is multiplied for each date with corresponding forecasted blend of underlying components traded in the futures market to determine predicted gas station price net of applicable taxes. Subsequently applicable federal and state taxes are added back to come up with the projection of the retail gas station for a given blend for a given day. This given day may be received from, for example, a front-end component. The exact forecasting from the ratio time series is learned via training using a machine learning algorithm, and specifically only a subset of the ratio time series may be used during training. This may be performed by training the model using a series of subsets and determining root mean square error of each subset.

In parallel, historical gas station price data may be used to predict the price using a second gas station price prediction machine learned model 214, which considers the gas station historical time series from the gas station price service 210, without considering the learned lag. Once again, if adequate history is not found for this data, adequate replacement data, as defined by a rules framework, may be substituted. For example, if a particular gas station does not have pricing data for a particular date range, a next closest gas station's prices may be substituted, if permitted by the rules framework. The forecasting may be performed by training the model using a series of subsets and determining root mean square error of each subset.

A pricing model selection component 216 may then select from between the first gas station price prediction model 212 and the second gas station price prediction model 214. Historical results in the application tables of the in-memory database may be reviewed to identify a pattern of a winning model, and factors such as lowest root mean square error may be considered as a key criterion.

Figure 4:
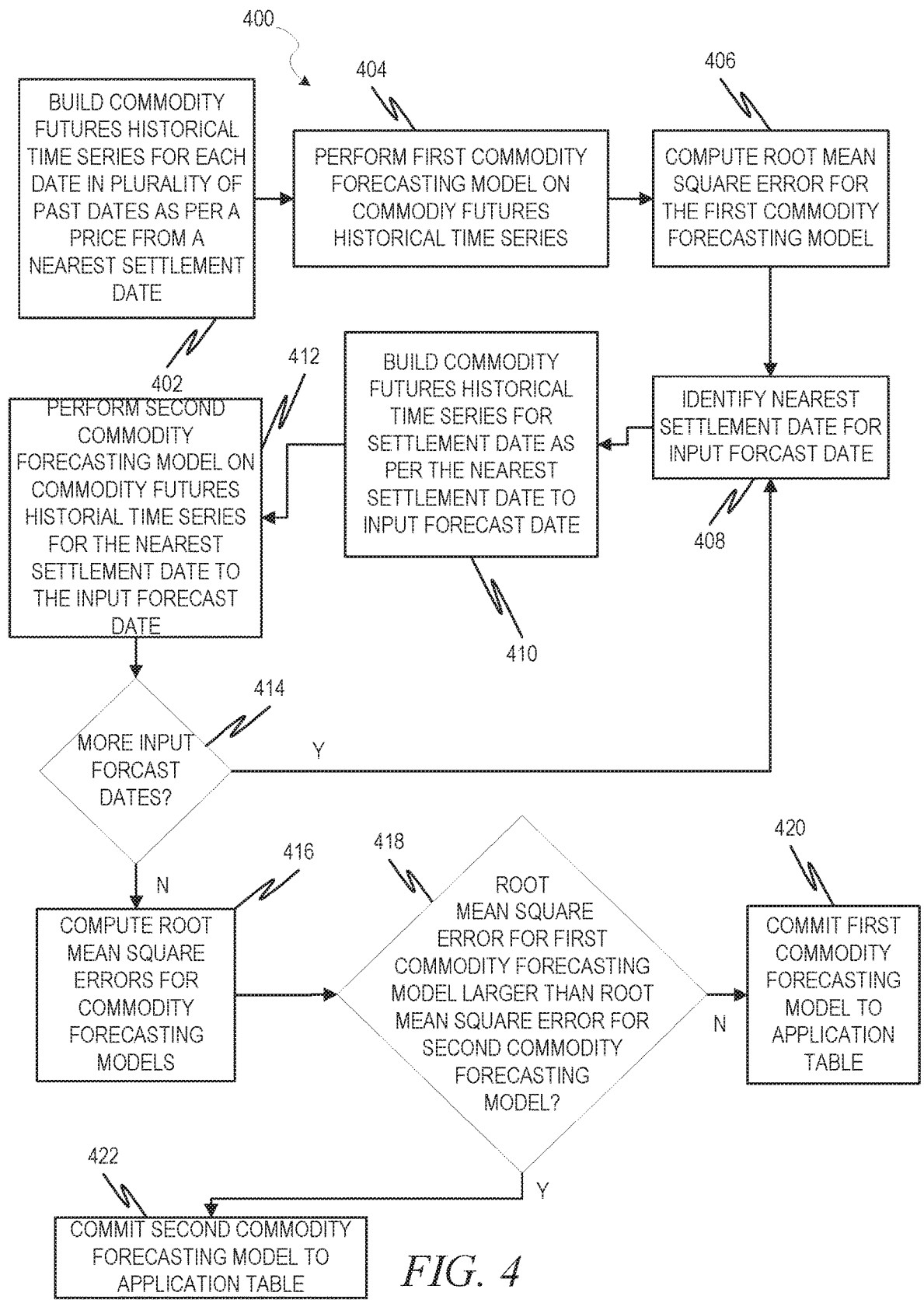
FIG. 4 is a flow diagram illustrating a method for forecasting a fuel component price in accordance with an example embodiment.

FIG. 4 is a flow diagram illustrating a method 400 for forecasting a fuel component price in accordance with an example embodiment. This method 400 may be performed for each of a plurality of different fuel components that make up one or more fuel blends whose retail price is to be forecast using 200 (A,B,C), 202 (A,B,C) and 204(A,B,C). Examples of fuel components that the method 400 may be applied to include gasoline, ethanol, and heating oil.

At operation 402, a commodity futures historical time series is built for each date in a plurality of past dates per a price from a nearest settlement date. This may include addressing any gaps that exist in pricing data due to weekends or holidays by taking the next working day price if the day in question is a Sunday and the prior working day price if it is anything other than a Sunday (e.g., if it is a Saturday, or a holiday that falls on a Wednesday).

At operation 404, a first commodity forecasting model is performed on the commodity futures historical time series. At operation 406, a root mean square error for the first commodity forecasting model is computed.

At operation 408, a nearest settlement date for an input forecast date is identified. At operation 410, a commodity futures historical time series for the nearest settlement date to the input forecast date is built. This may include addressing any gaps that exist in pricing data due to weekends or holidays by taking the next working day price if the day in question is a Sunday and the prior working day price if it is anything other than a Sunday (e.g., if it is a Saturday, or a holiday that falls on a Wednesday). At operation 412, a second commodity forecasting model is performed on the commodity futures historical time series for the nearest settlement date to the input forecast date. At operation 414, it is determined if there are any more input forecast dates. If so, then the method 400 loops back to operation 408 for the next input forecast date. If not, then at operation 416 a root mean square error for the second commodity forecasting model is computed.

At operation 418, the root mean square errors for the first commodity forecasting model and the second commodity forecasting model are compared. If the root mean square error for the first commodity forecasting model is less than the root mean square error for the second commodity forecasting model, then at operation 420 the first commodity forecasting model is committed to an application table in an in-memory database. If the root mean square error for the first commodity forecasting model is more than the root mean square error for the second commodity forecasting model, then at operation 422 the second commodity forecasting model is committed to an application table in an in-memory database.

Figure 5:
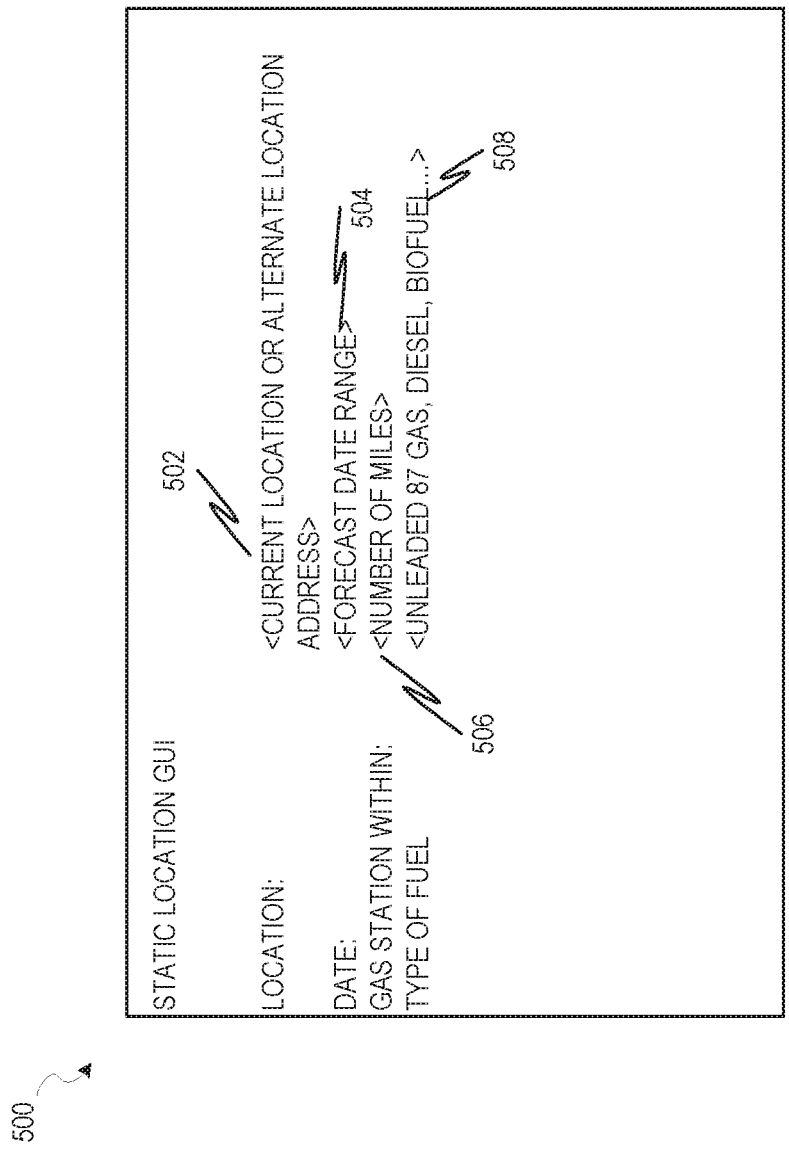
FIG. 5 is a screen capture illustrating an example user input screen in accordance with an example embodiment.

FIG. 5 is a screen capture illustrating an example user input screen 500 in accordance with an example embodiment. Here, the user is entering a static location. Thus, a specific location box 502 is provided for user entry. Also provided are boxes for a forecast date range 504, a distance range of eligible gas stations (from the specified location) 506, and a type of fuel 508. It should be noted that this input may be obtained via some other means other than direct text entry into boxes, such as clicking on maps, selection of displayed dates, etc.

Figure 6:
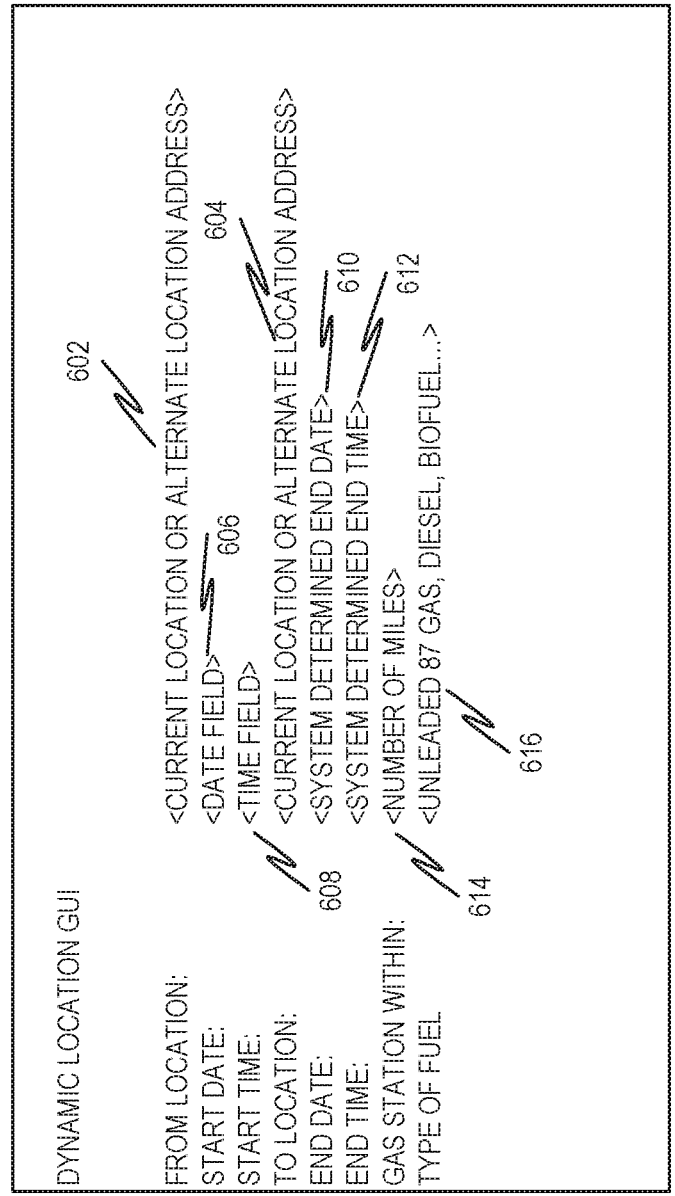
FIG. 6 is a screen capture illustrating another example user input screen in accordance with another example embodiment.

FIG. 6 is a screen capture illustrating another example user input screen 600 in accordance with another example embodiment. Here, the user is entering a dynamic location, in other words a route from a start location to an end location. Boxes for the starting location 602 and ending location 604 are provided, along with start date 606, start time 608, end date 610, end time 612, distance range of eligible gas stations (from any point on the route) 614, and a type of fuel 616. It should be noted that this input may be obtained via some other means other than direct text entry into boxes, such as clicking on maps, selection of displayed dates, etc.

A map service API may be called to retrieve a list of eligible gas stations, based on the specified range and location(s), along with an estimated date (and possibly time) of arrival at the various gas stations. This is important because the present solution allows for the prediction of future fuel prices, and thus permits the system to be nimble enough to display or otherwise consider the price of fuel at a gas station as it will be on the day (or time) that one arrives at the gas station. This is in contrast to prior art solutions that might only consider the current price or otherwise not the the arrival date/time to a predicted price.

Figure 7:
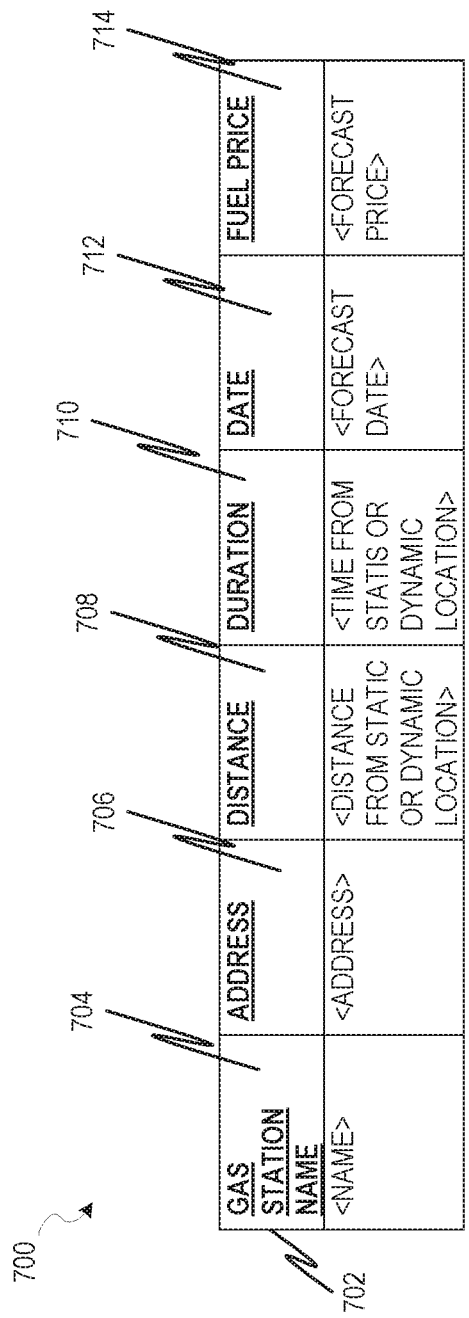
FIG. 7 is a screen capture illustrating an example output screen in accordance with an example embodiment.

FIG. 7 is a screen capture illustrating an example output screen 700 in accordance with an example embodiment. Here, a table 702 is depicted. A gas station name column 704 may indicate a name or other identification of a gas station. An address column 706 may indicate an address of the corresponding gas station. Distance column 708 may indicate a distance to the corresponding gas station. For a static location embodiment, this distance is the distance from the static location, while for a dynamic location embodiment, this distance is the distance from the route (i.e., the detour distance). A duration column 710 may indicate the duration to the corresponding gas station. This is similar to distance, except expressed in time instead of distance. A date column 712 may indicate the forecast date of arrival at the corresponding gas station and a gas price column 714 may indicate the forecast price on that date.

It should be noted that there are a variety of different practical use cases to which the forecast price(s) can be used. As described earlier, a mapping application may be modified to provide route recommendations that not only include minimizing the time required to travel from a starting location to an ending location but also to minimize the fuel cost in such travel based on projected prices. The forecast price at each location along a route may also be displayed, in terms of the estimated price for the estimated time of arrival (as opposed to the current price, which may change by the time of arrival). Logistics service providers can also optimize their choices of routes by determining the gas stations on the route and the projected price.

EXAMPLES

Example 1

A system comprising:
at least one hardware processor; and
a non-transitory computer-readable medium storing instructions that, when executed by the at least one hardware processor, cause the at least one hardware processor to perform operations comprising:
receiving an identification of a fueling station and an identification of a fuel blend;
retrieving, using the identification of the fueling station, from a machine-learned model, a value, corresponding to the fueling station, for a first parameter;
setting a value of a second parameter to zero;

obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;
accessing, using the identification of the fuel blend and the identification of the fueling station, a fuel station price time series, the fuel station price time series being a set of prices charged for the fuel blend by the gas station over a plurality of dates, beginning with a date based on the value for the first parameter;
calculating a ratio time series corresponding to the value for the second parameter by dividing the fuel station price time series by the blended fuel price time series;
computing a standard deviation for the ratio time series corresponding to the value for the second parameter;
if the second parameter is zero, or if the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;
outputting the ratio time series corresponding to the value for the second parameter; and
feeding the value for the second parameter minus one and the standard deviation for the ratio time series corresponding to the value for the second parameter minus one into a machine learning algorithm to retrain the machine-learned model.

Example 2

The system of Example 1, wherein the operations further comprise:
retrieving, using the identification of the fueling station, from the machine-learned model, a value, corresponding to the fueling station, for a third parameter;
wherein the repeating is additionally performed if the value for the second parameter is less than or equal to the value for the third parameter; and
wherein the feeding further includes feeding the value for the standard deviation for the ratio time series corresponding to the value for the third parameter into the machine learning algorithm to retrain the machine-learned model.

Example 3

The system of Examples 1 or 2, wherein the operations further comprise:
using a second machine-learned model to predict a price charged by the fueling station for the fuel blend on a future date based on the outputted ratio time series corresponding to the value for the second parameter.

Example 4

The system of Example 3, wherein the second machine-learned model multiplies a ratio on each date in the outputted ratio time series corresponding to the value for the second parameter by a corresponding blended fuel price from the blended fuel price time series.

Example 5

The system of Examples 3 or 4, wherein the operations further comprise:
using a third machine-learned model to predict the price charged by the fueling station for the fuel blend on the future date based on historical data corresponding to the fueling station.

Example 6

The system of Example 5, wherein the operations further comprise:
using a fourth machine-learned model to select output from either the second machine-learned model or the third machine-learned model as representative of a predicted price charged by the fueling station for the fuel blend on the future date.

Example 7

The system of any of Examples 1-6, wherein the blended fuel price time series contains prices based on predicted blend prices from predictions of prices of individual component parts of the fuel blend, each price of individual component parts of the fuel blend predicted by a different machine-learned algorithm trained specifically for the corresponding individual component part.

Example 8

A method comprising:
receiving an identification of a fueling station and an identification of a fuel blend;
retrieving, using the identification of the fueling station, from a machine-learned model, a value, corresponding to the fueling station, for a first parameter;
setting a value of a second parameter to zero;
obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;
accessing, using the identification of the fuel blend and the identification of the fueling station, a fuel station price time series, the fuel station price time series being a set of prices charged for the fuel blend by the gas station over a plurality of dates, beginning with a date based on the value for the first parameter;
calculating a ratio time series corresponding to the value for the second parameter by dividing the fuel station price time series by the blended fuel price time series;
computing a standard deviation for the ratio time series corresponding to the value for the second parameter;
if the second parameter is zero, or if the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;
outputting the ratio time series corresponding to the value for the second parameter; and
feeding the value for the second parameter minus one and the standard deviation for the ratio time series corresponding to the value for the second parameter minus one into a machine learning algorithm to retrain the machine-learned model.

Example 9

The method of Example 8, wherein the operations further comprise:
retrieving, using the identification of the fueling station, from the machine-learned model, a value, corresponding to the fueling station, for a third parameter;
wherein the repeating is additionally performed if the value for the second parameter is less than or equal to the value for the third parameter; and
wherein the feeding further includes feeding the value for the standard deviation for the ratio time series corresponding to the value for the third parameter into the machine learning algorithm to retrain the machine-learned model.

Example 10

The method of Example 8 or 9, wherein the operations further comprise:
using a second machine-learned model to predict a price charged by the fueling station for the fuel blend on a future date based on the outputted ratio time series corresponding to the value for the second parameter.

Example 11

The method of Example 10, wherein the second machine-learned model multiplies a ratio on each date in the outputted ratio time series corresponding to the value for the second parameter by a corresponding blended fuel price from the blended fuel price time series.

Example 12

The method of Examples 10 or 11, wherein the operations further comprise:
using a third machine-learned model to predict the price charged by the fueling station for the fuel blend on the future date based on historical data corresponding to the fueling station.

Example 13

The method of Example 12, wherein the operations further comprise:
using a fourth machine-learned model to select output from either the second-machine learned model or the third-machine learned model as representative of a predicted price charged by the fueling station for the fuel blend on the future date.

Example 14

The method of any of Examples 8-13, wherein the blended fuel price time series contains prices based on predicted blend prices from predictions of prices of individual component parts of the fuel blend, each price of individual component parts of the fuel blend predicted by a different machine-learned algorithm trained specifically for the corresponding individual component part.

Example 15

A non-transitory machine-readable medium storing instructions which, when executed by one or more processors, cause the one or more processors to perform operations comprising:

receiving an identification of a fueling station and an identification of a fuel blend;

retrieving, using the identification of the fueling station, from a machine-learned model, a value, corresponding to the fueling station, for a first parameter;

setting a value of a second parameter to zero;

obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;

accessing, using the identification of the fuel blend and the identification of the fueling station, a fuel station price time series, the fuel station price time series being a set of prices charged for the fuel blend by the gas station over a plurality of dates, beginning with a date based on the value for the first parameter;

calculating a ratio time series corresponding to the value for the second parameter by dividing the fuel station price time series by the blended fuel price time series;

computing a standard deviation for the ratio time series corresponding to the value for the second parameter;

if the second parameter is zero, or if the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;

outputting the ratio time series corresponding to the value for the second parameter; and feeding the value for the second parameter minus one and the standard deviation for the ratio time series corresponding to the value for the second parameter minus one into a machine learning algorithm to retrain the machine-learned model.

Example 16

The non-transitory machine-readable medium of Example 15, wherein the operations further comprise:

retrieving, using the identification of the fueling station, from the machine-learned model, a value, corresponding to the fueling station, for a third parameter;

wherein the repeating is additionally performed if the value for the second parameter is less than or equal to the value for the third parameter; and wherein the feeding further includes feeding the value for the standard deviation for the ratio time series corresponding to the value for the third parameter into the machine learning algorithm to retrain the machine-learned model.

Example 17

The non-transitory machine-readable medium of Example 15 or wherein the operations further comprise:

using a second machine-learned model to predict a price charged by the fueling station for the fuel blend on a future date based on the outputted ratio time series corresponding to the value for the second parameter.

Example 18

The non-transitory machine-readable medium of Example 17, wherein the second machine-learned model multiplies a ratio on each date in the outputted ratio time series corresponding to the value for the second parameter by a corresponding blended fuel price from the blended fuel price time series.

Example 19

The non-transitory machine-readable medium of Examples 17 or 18, wherein the operations further comprise:

using a third machine-learned model to predict the price charged by the fueling station for the fuel blend on the future date based on historical data corresponding to the fueling station.

Example 20

The non-transitory machine-readable medium of Example 19, wherein the operations further comprise:

using a fourth machine-learned model to select output from either the second machine-learned model or the third machine-learned model as representative of a predicted price charged by the fueling station for the fuel blend on the future date.

Figure 8:
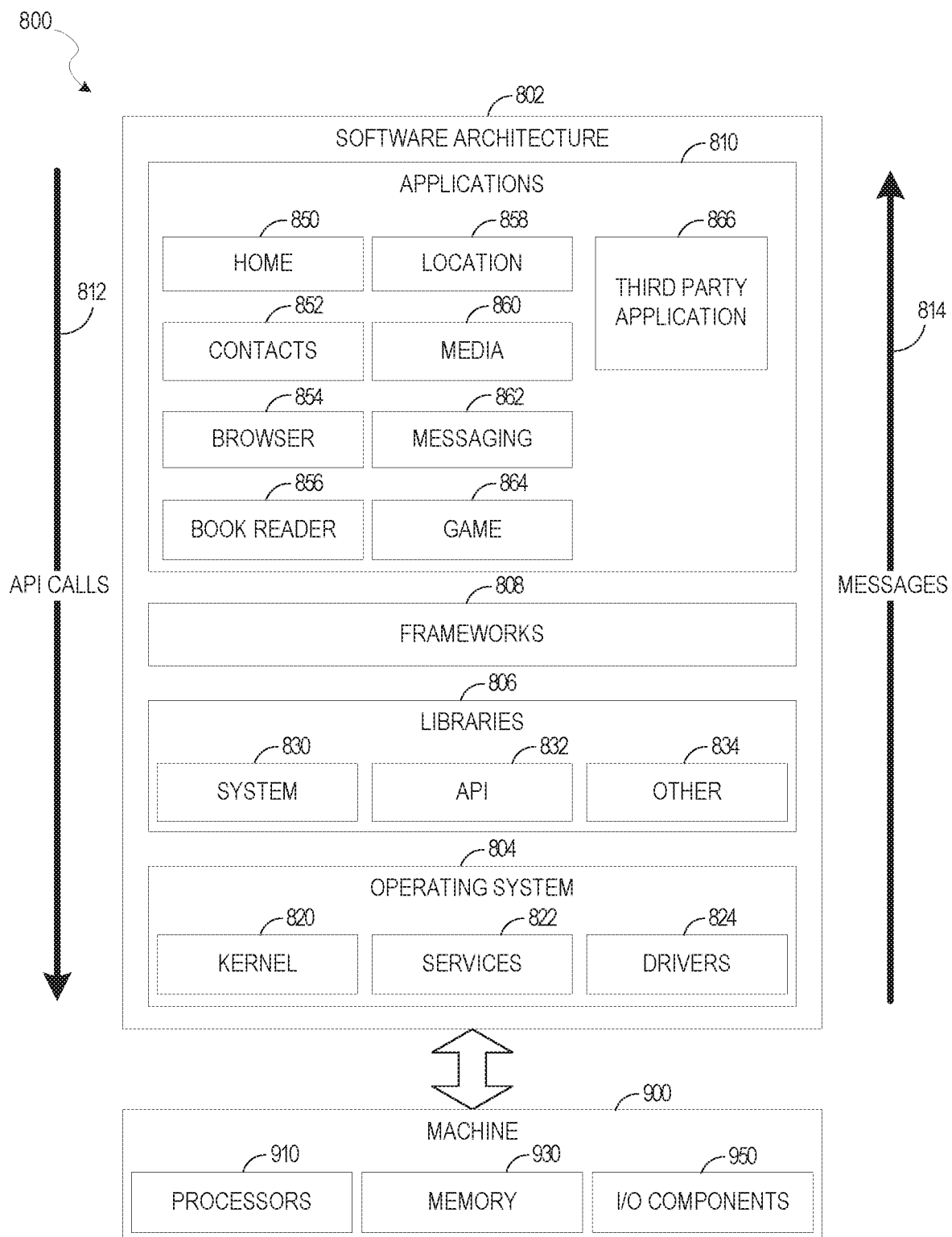
FIG. 8 is a block diagram illustrating an architecture of software, which can be installed on any one or more of the devices described herein.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AA. Adaptive Multi-Rate (AMR) audio codec, Joint Photographic Experts Group (JEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
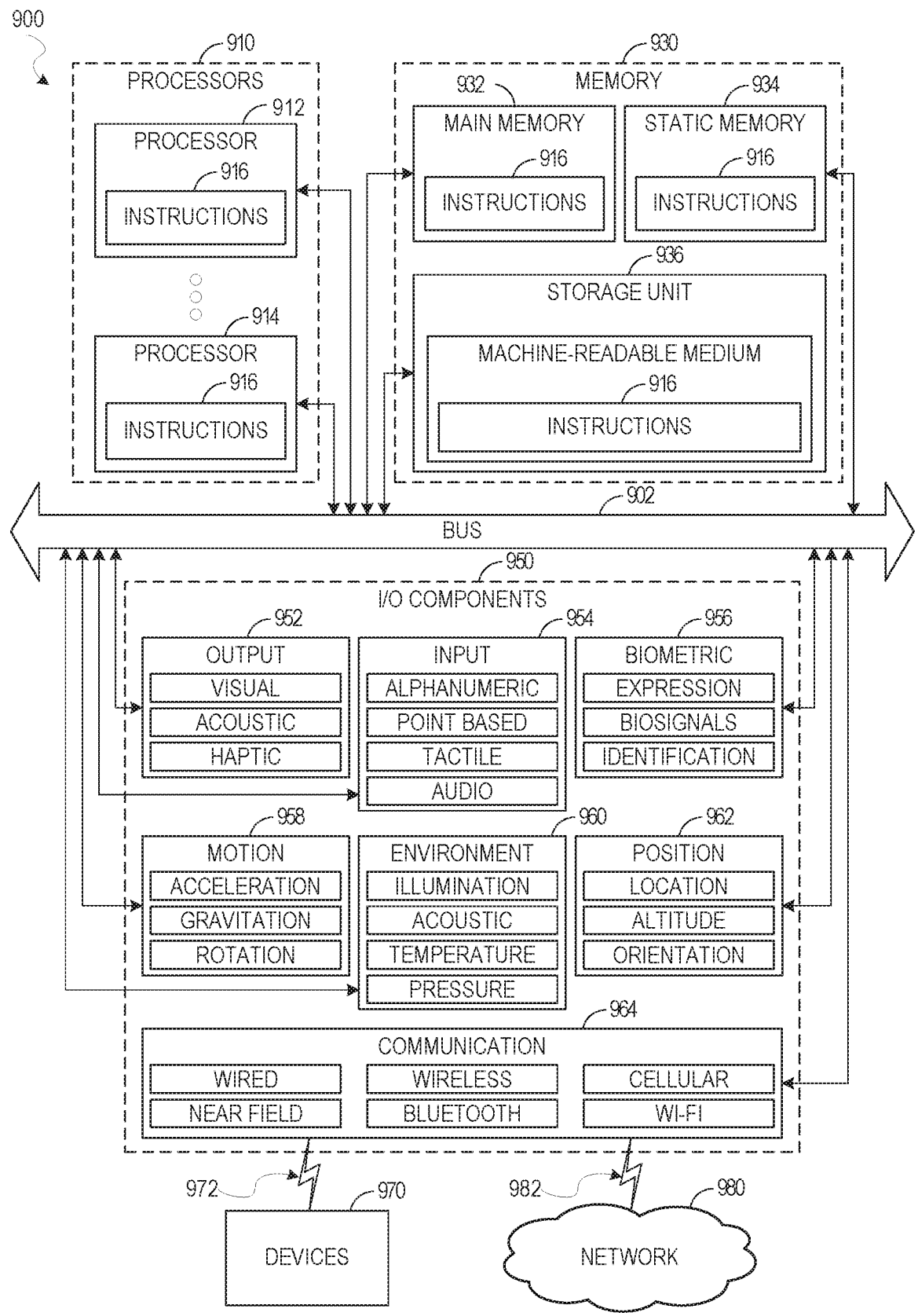
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment, Specifically, FIG. 9 shows a diagrammatic representation of the machine 900 in the example form of a computer system, within which instructions 916 (e.g., software, a program, an application, an apples, an app, or other executable code) for causing the machine 900 to perform any one or more of the methodologies discussed herein may be executed. For example, the instructions 916 may cause the machine 900 to execute the methods of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments. As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (ENDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing historical data;
   transforming the historical data into a ratio time series;
   training a machine-learned model, using a machine learning algorithm, to predict a value of a first parameter for an input fueling station, using the ratio time series;
   receiving an identification of a fueling station and an identification of a fuel blend;
   retrieving, using the identification of the fueling station, from the machine-learned model, a value, corresponding to the fueling station, for the first parameter;
   setting a value of a second parameter to zero;
   obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;
   accessing, using the identification of the fuel blend and the identification of the fueling station, a fuel station price time series, the fuel station price time series being a set of prices charged for the fuel blend by the fueling station over a plurality of dates, beginning with a date based on the value for the first parameter;
   calculating a ratio time series corresponding to the value for the second parameter by dividing the fuel station price time series by the blended fuel price time series;
   computing a standard deviation for the ratio time series corresponding to the value for the second parameter;
   in response to a determination that either the second parameter is zero or the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;
   outputting the ratio time series corresponding to the value for the second parameter; and
   retraining the machine-learned model by feeding the value for the second parameter minus one and the standard deviation for the ratio time series corresponding to the value for the second parameter minus one into the machine learning algorithm, the retraining causing the machine-learned model to more accurately adjust itself to each fueling station.

2. The system of claim 1, wherein the operations further comprise:
   retrieving, using the identification of the fueling station, from the machine-learned model, a value, corresponding to the fueling station, for a third parameter;
   wherein the repeating is additionally performed if the value for the second parameter is less than or equal to the value for the third parameter; and
   wherein the feeding further includes feeding the value for the standard deviation for the ratio time series corresponding to the value for the third parameter into the machine learning algorithm to retrain the machine-learned model.

3. The system of claim 1, wherein the operations further comprise:
   using a second machine-learned model to predict a price charged by the fueling station for the fuel blend on a future date based on the outputted ratio time series corresponding to the value for the second parameter.

4. The system of claim 3, wherein the second machine-learned model multiplies a ratio on each date in the outputted ratio time series corresponding to the value for the second parameter by a corresponding blended fuel price from the blended fuel price time series.

5. The system of claim 3, wherein the operations further comprise:
using a third machine-learned model to predict the price charged by the fueling station for the fuel blend on the future date based on historical data corresponding to the fueling station.

6. The system of claim 5, wherein the operations further comprise:
using a fourth machine-learned model to select output from either the second machine-learned model or the third machine-learned model as representative of a predicted price charged by the fueling station for the fuel blend on the future date.

7. A method comprising:
accessing historical data;
transforming the historical data into a ratio time series;
training a machine-learned model, using a machine learning algorithm, to predict a value of a first parameter for an input fueling station, using the ratio time series;
receiving an identification of a fueling station and an identification of a fuel blend;
retrieving, using the identification of the fueling station, from the machine-learned model, a value, corresponding to the fueling station, for the first parameter;
setting a value of a second parameter to zero;
obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;
accessing, using the identification of the fuel blend and the identification of the fueling station, a fuel station price time series, the fuel station price time series being a set of prices charged for the fuel blend by the fueling station over a plurality of dates, beginning with a date based on the value for the first parameter;
calculating a ratio time series corresponding to the value for the second parameter by dividing the fuel station price time series by the blended fuel price time series;
computing a standard deviation for the ratio time series corresponding to the value for the second parameter;
in response to a determination that either the second parameter is zero or the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;
outputting the ratio time series corresponding to the value for the second parameter; and
retraining the machine-learned model by feeding the value for the second parameter minus one and the standard deviation for the ratio time series corresponding to the value for the second parameter minus one into the machine learning algorithm, the retraining causing the machine-learned model to more accurately adjust itself to each fueling station.

8. The method of claim 7, further comprising:
retrieving, using the identification of the fueling station, from the machine-learned model, a value, corresponding to the fueling station, for a third parameter;
wherein the repeating is additionally performed if the value for the second parameter is less than or equal to the value for the third parameter; and
wherein the feeding further includes feeding the value for the standard deviation for the ratio time series corresponding to the value for the third parameter into the machine learning algorithm to retrain the machine-learned model.

9. The method of claim 7, further comprising:
using a second machine-learned model to predict a price charged by the fueling station for the fuel blend on a future date based on the outputted ratio time series corresponding to the value for the second parameter.

10. The method of claim 9, wherein the second machine-learned model multiplies a ratio on each date in the outputted ratio time series corresponding to the value for the second parameter by a corresponding blended fuel price from the blended fuel price time series.

11. The method of claim 9, further comprising:
using a third machine-learned model to predict the price charged by the fueling station for the fuel blend on the future date based on historical data corresponding to the fueling station.

12. The method of claim 11, further comprising:
using a fourth machine-learned model to select output from either the second machine-learned model or the third machine-learned model as representative of a predicted price charged by the fueling station for the fuel blend on the future date.

13. A non-transitory machine-readable medium storing instructions which, when executed by one or more processors, cause the one or more processors to perform operations comprising:
accessing historical data;
transforming the historical data into a ratio time series;
training a machine-learned model, using a machine learning algorithm, to predict a value of a first parameter for an input fueling station, using the ratio time series;
receiving an identification of a fueling station and an identification of a fuel blend;
retrieving, using the identification of the fueling station, from the machine-learned model, a value, corresponding to the fueling station, for the first parameter;
setting a value of a second parameter to zero;
obtaining, using the identification of the fuel blend and the value for the first parameter, a blended fuel price time series, the blended fuel price time series being a set of prices for component parts of the fuel blend over a plurality of dates, beginning with a date based on a difference of the value for the first parameter minus the value for the second parameter;
accessing, using the identification of the fuel blend and the identification of the fueling station, a fuel station price time series, the fuel station price time series being a set of prices charged for the fuel blend by the fueling station over a plurality of dates, beginning with a date based on the value for the first parameter;
calculating a ratio time series corresponding to the value for the second parameter by dividing the fuel station price time series by the blended fuel price time series;

computing a standard deviation for the ratio time series corresponding to the value for the second parameter;

in response to a determination that either the second parameter is zero or the standard deviation for the ratio time series corresponding to the value for the second parameter is less than or equal to the standard deviation for the ratio time series corresponding to the difference between the value for the second parameter minus one, incrementing the value of the second parameter by one and repeating the receiving, retrieving, setting, accessing, calculating, computing, and incrementing until the standard deviation for the ratio time series is not less than or equal to the standard deviation for the ratio time series corresponding to the difference between the value for the second parameter minus one;

outputting the ratio time series corresponding to the value for the second parameter; and retraining the machine-learned model by feeding the value for the second parameter minus one and the standard deviation for the ratio time series corresponding to the value for the second parameter minus one into the machine learning algorithm, the retraining causing the machine-learned model to more accurately adjust itself to each fueling station.

14. The non-transitory machine-readable medium of claim 13, wherein the operations further comprise:

retrieving, using the identification of the fueling station, from the machine-learned model, a value, corresponding to the fueling station, for a third parameter;

wherein the repeating is additionally performed if the value for the second parameter is less than or equal to the value for the third parameter; and wherein the feeding further includes feeding the value for the standard deviation for the ratio time series corresponding to the value for the third parameter into the machine learning algorithm to retrain the machine-learned model.

15. The non-transitory machine-readable medium of claim 13, wherein the operations further comprise:

using a second machine-learned model to predict a price charged by the fueling station for the fuel blend on a future date based on the outputted ratio time series corresponding to the value for the second parameter.

16. The non-transitory machine-readable medium of claim 15, wherein the second machine-learned model multiplies a ratio on each date in the outputted ratio time series corresponding to the value for the second parameter by a corresponding blended fuel price from the blended fuel price time series.

17. The non-transitory machine-readable medium of claim 15, wherein the operations further comprise:

using a third machine-learned model to predict the price charged by the fueling station for the fuel blend on the future date based on historical data corresponding to the fueling station.

18. The non-transitory machine-readable medium of claim 17, wherein the operations further comprise:

using a fourth machine-learned model to select output from either the second machine-learned model or the third machine-learned model as representative of a predicted price charged by the fueling station for the fuel blend on the future date.

19. The system of claim 1, wherein the blended fuel price time series contains prices based on predicted blend prices from predictions of prices of individual component parts of the fuel blend, each price of individual component parts of the fuel blend predicted by a different machine-learned model trained specifically for corresponding individual component part.

20. The method of claim 7, wherein the blended fuel price time series contains prices based on predicted blend prices from predictions of prices of individual component parts of the fuel blend, each price of individual component parts of the fuel blend predicted by a different machine-learned model trained specifically for corresponding individual component part.

21. The non-transitory machine-readable medium of claim 13, wherein the blended fuel price time series contains prices based on predicted blend prices from predictions of prices of individual component parts of the fuel blend, each price of individual component parts of the fuel blend predicted by a different machine-learned model trained specifically for corresponding individual component part.

* * * * *